(12) United States Patent
Fano

(10) Patent No.: US 7,912,797 B2
(45) Date of Patent: Mar. 22, 2011

(54) MONITORING AND CONTROL OF ANALYTICAL EFFECTIVENESS IN AN ANALYST NETWORK

(75) Inventor: Andrew E. Fano, Lincolnshire, IL (US)

(73) Assignee: Accenture Global Services Limited, Dublin (IE)

( * ) Notice: Subject to any disclaimer, the term of this patent is extended or adjusted under 35 U.S.C. 154(b) by 1008 days.

(21) Appl. No.: 11/686,654

(22) Filed: Mar. 15, 2007

(65) Prior Publication Data

US 2008/0228803 A1   Sep. 18, 2008

(51) Int. Cl.
*G06F 17/30* (2006.01)
*G06N 3/12* (2006.01)

(52) U.S. Cl. .......... 706/25; 706/11; 706/13; 706/62; 707/1; 707/2; 707/3; 707/4; 707/500

(58) Field of Classification Search .......... 706/11, 706/47, 62, 25; 345/326, 340, 348, 350; 705/36 R; 707/1–4, 500, 526, 532; 348/143
See application file for complete search history.

(56) References Cited

U.S. PATENT DOCUMENTS 6,327,586 B1 * 12/2001 Kisiel .................. 1/1

OTHER PUBLICATIONS

"Open-Source Spying", by Clive Thompson, The New York Times, Dec. 3, 2006.

* cited by examiner

*Primary Examiner* — Donald Sparks
*Assistant Examiner* — Ola Olude-Afolabi
(74) *Attorney, Agent, or Firm* — Vedder Price PC

(57) ABSTRACT

Monitoring and/or controlling analytical effectiveness of a plurality of analysts in an analyst network is provided. In one embodiment, information concerning treatment of information elements (i.e., discrete quantities of content suitable for analysis by one or more analysts) within an analyst network by the plurality of analysts is provided to a management terminal. Based on this treatment information, the management terminal determines information concerning achievement of analysis goals. In another embodiment, the management terminal receives modifications to the analysis goals that are used to provide modified analysis goals, which modified analysis goals are subsequently provided to the routing controller. In this manner, the present invention provides the ability to determine whether the available analyst resources are being used in the best manner to address the universe of available topics in the most efficient and productive manner.

18 Claims, 7 Drawing Sheets

- PRIOR ART -

MONITORING AND CONTROL OF ANALYTICAL EFFECTIVENESS IN AN ANALYST NETWORK

CROSS-REFERENCE TO RELATED APPLICATIONS

This application is related to the subject matter disclosed in the following two co-pending applications: U.S. patent application Ser. No. 11/686,615, filed on Mar. 15, 2007 entitled "Optimization of Analytical Effectiveness in an Analyst Network" and U.S. patent application Ser. No. 11/686,693, filed on Mar. 15, 2007 entitled "Presentation of Information Elements in an Analyst Network."

FIELD OF THE INVENTION

The present invention relates generally to analyst networks and, in particular, to the optimization of analytical effectiveness in such analyst networks.

BACKGROUND OF THE INVENTION

Analyst systems are well known in the art. Within such systems, individual analysts tend to work on those topics that are of particular interest to, or that are assigned to, him or her. As used herein, an analyst is any person that processes a large amount of content (i.e., materials of virtually any nature) in order to become more knowledgeable about that topic and, of particular importance, to be able to develop appropriately meaningful insight and responses of such knowledge. Even where topics are specifically assigned to individual analysts, each analysts still has the ability to select the particular content that he/she will review. For example, particularly where content is available in electronic form, i.e., via the World Wide Web or other electronically accessible network, this is often done through the use of programmable search "filters" configured by the each analyst. Unfortunately, this approach tends to lead to dissatisfactory results.

Typical results for such a self-directed approach are illustrated in FIG. 1, which depicts a topic-space 102 representative of the "universe" of available topics in which a plurality of analysts (illustrated in FIG. 1 as plurality of circles whose size correspond to the relative scope of topic coverage provided by each analyst) self-direct the coverage applied to the various topics available within the topic-space 102. As is often the case, certain topics tend to become over covered while other topics go completely unserved. For example, as shown, a first analyst 104 may operate on one or more topics that are not covered by any other analyst. Alternatively, a second 106 and third analyst 108 may provide overlapping coverage on topics as shown. Taking this to a further extreme, clusters of analyst 110 may develop around a relatively small number of topics to the exclusion of other potentially important topics. Further still, reflecting the relative efficiency of individual analysts, the work of an analyst 112 focusing in on a relatively narrow field of topics may be subsumed entirely by the work of another analyst 114 covering a broader range of topics.

The result of this approach is that, while each analyst may do a good job individually, overall intelligence analysts are not used optimally. That is, if one considers the overall analytical capability of a plurality of analysts as a finite resource, such an approach does not ensure that this finite resource will be used in an optimal manner in which the broadest possible range of the most important topics are covered by an appropriate number of selectively focused analysts. This desired situation is illustrated schematically in FIG. 2, in which groups of analysts 202, 204 are purposefully aligned to provide relatively broad coverage around particularly important concepts. Within such groups, overlap of coverage may be purposefully designed, as well as the breadth of coverage provided by any individual analyst.

Currently, most efforts aimed at improving the effectiveness of analyst are directed to the sharing of information between disparate information sources. For example, within the various intelligence agencies overseen by the U.S. federal and state governments, significant resources are being applied to foster sharing of information between the databases compiled by each agency. Additionally, rather than moving towards more structured control of the operation of analysts, current approaches tend to emphasize the use of user-directed collaboration tools, such as so-called "wikis" and web logs (often referred to as "blogs") in an effort to leverage the widest possible array of analysts. While such efforts may improve the efficiency and efficacy of analyst networks, significant concerns exist regarding the security and privacy implications of the information being shared. Furthermore, such approaches do not address the need to optimize the use of available analyst resources to ensure that priority topics are being addressed. Thus, it would be advantageous to provide techniques that overcome these limitations found in prior art techniques.

SUMMARY OF THE INVENTION

In accordance with the above, the present disclosure describes a system that makes use of a variety of information including, but not limited to, analyst availability, analyst expertise, priorities of the topics to be covered, volume of information per topic, data about what information has already been reviewed, etc. when attempting to optimize the use of available analyst resources. The resulting system thereby enables, among other things, prioritization of what is presented to particular analysts to achieve targeted levels of coverage of different topics across multiple analysts, provision to analysts of information necessary to make judgments about what should be viewed, and provision to management of information regarding analysis goals achievement necessary to appropriately manage the assignment of analysts.

The present disclosure describes various techniques for monitoring and/or controlling analytical effectiveness of a plurality of analysts. In one embodiment, information concerning treatment of information elements (i.e., discrete quantities of content suitable for analysis by one or more analysts) within an analyst network by the plurality of analysts is provided to a management terminal. Based on this treatment information, the management terminal is able to determine information concerning achievement of analysis goals, which achievement information may be subsequently displayed or otherwise disseminated. In another embodiment, the management terminal may receive modifications to the analysis goals. The modifications are applied to the analysis goals to provide modified analysis goals, which modified analysis goals are subsequently provided to the routing controller. In this manner, the present invention provides the ability to determine whether the available analyst resources are being used in the best manner to address the universe of available topics in the most efficient and productive manner.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION OF THE PRESENT EMBODIMENTS

Figure 1:
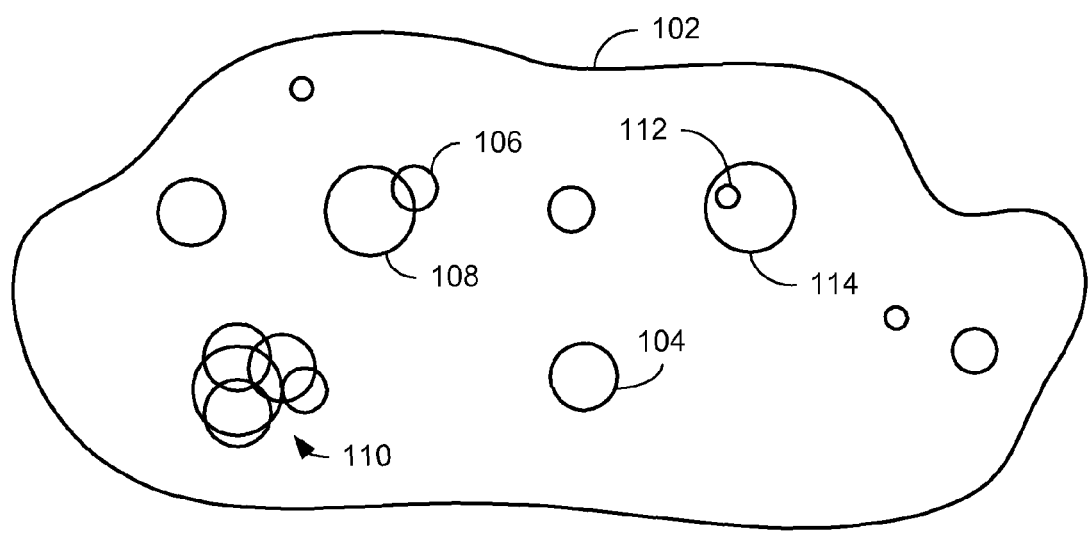
FIG. 1 is a schematic illustration analyst performance based on prior art analyst techniques.
Figure 2:
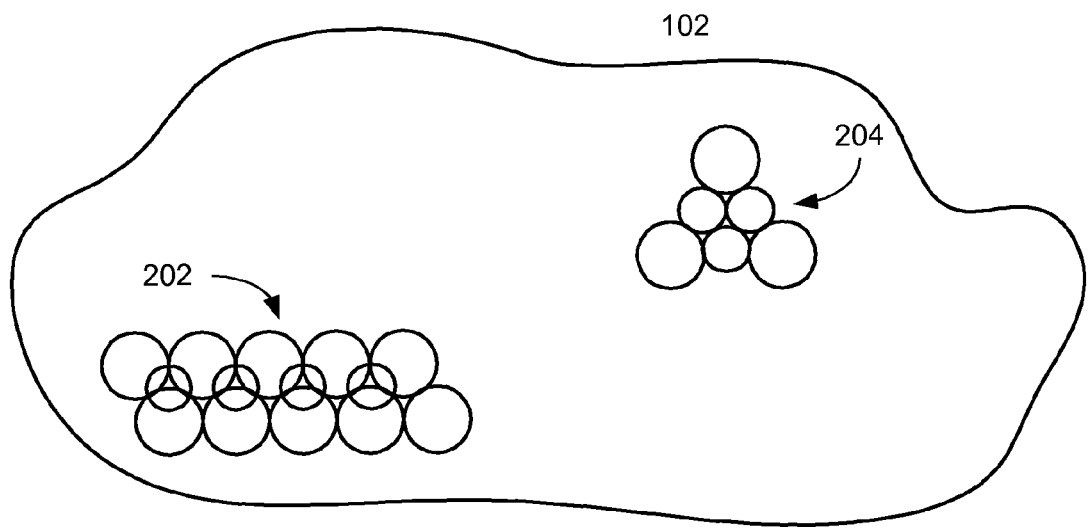
FIG. 2 is a schematic illustration of desired analyst performance.
Figure 3:
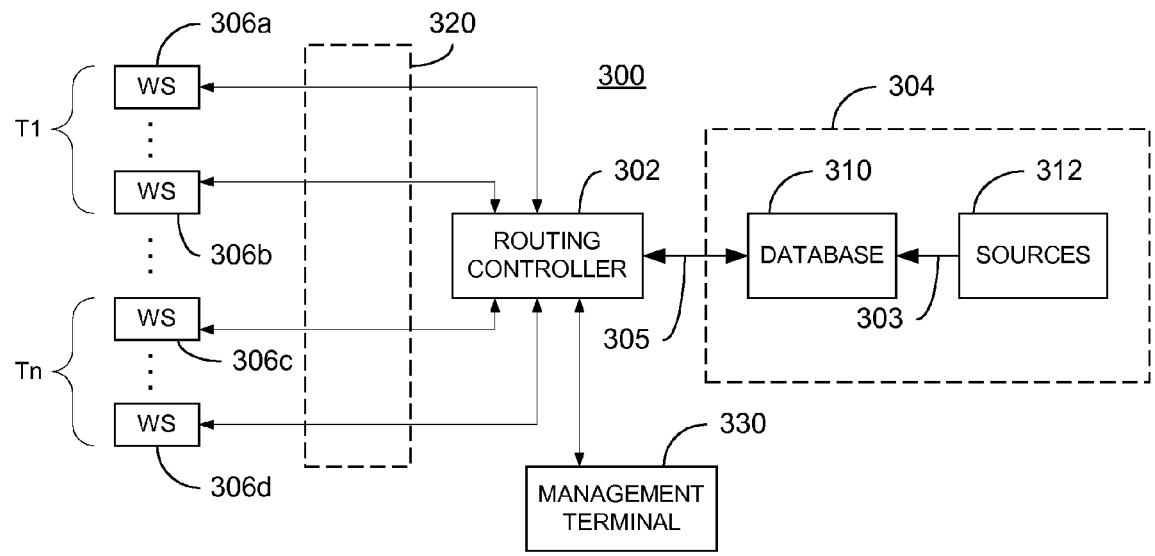
FIG. 3 is a schematic block diagram of an analyst network in accordance with an embodiment disclosed herein.

Referring now to FIG. 3, an embodiment of an analyst network 300 is illustrated. In particular, the analyst network 300 as shown comprises a routing controller 302 in communication with an information network 304. Additionally, the routing controller 302 is in communication with a plurality of workstations 306 via an intervening routing network 320. A management terminal 330 is also in communication with the routing controller 302. The routing controller 302 may comprise one or more appropriately programmed server computers or the like as known in the art and as described in greater detail below. In accordance with a presently preferred embodiment, the routing controller 302 operates to enforce an analysis plan which sets forth various analysis goals for the analyst network 300. Generally, the purpose of the analysis plan is to insure that a plurality of topics are suitably covered by the limited analytical resources available through a plurality of analyst. For example, the available analysts may be divided across N topics, with a particular percentage across each one. This may be a fixed percentage, a function of the volume of information at a given time for a given topic, the number of distinct subtopics present at a given time, etc. Once the plan is established, it is used to balance the load across the available analysts and achieve the most efficient overall coverage across analysts as a whole, as described in further detail below. As used herein, coverage of a given topic involves the reviewing and processing of information elements concerning that topic resulting in more complete awareness of, and enabling appropriate commentary on, the topic by one or more analysts. The analysis goals established by the analyst plan include, by way of non-limiting example, breadth of coverage of specific topics, depth of coverage of such topics as well as the degree of cross-fertilization between analyst groups and the degree of analyst utilization. In the context of the present invention, breadth of coverage refers to the condition that no fewer and no less than the desired number of topics are appropriately covered. Depth of coverage refers to not only developing an appropriate level of understanding about a certain topic, but also to insuring that a relatively small portion of all available information elements on that topic does not dominate the analysis. As described in greater detail below, degree of cross-fertilization between analysts groups refers to the beneficial sharing of information elements between analyst groups. Alternatively, cross-fertilization can be implemented to prevent sharing of information, e.g., to be sensitive to access restrictions. Such access restrictions may be the result of a number of factors including the information being classified and the clearance level of the analysts in intelligence applications, or the need to adhere to non-disclosure agreements or "Chinese walls" in business applications, or the need to adhere to copyright and distribution rights covering the materials in question. Degree of analyst utilization refers to the workload being handled by an individual analyst or group of analysts as assessed by any of a number of appropriate metrics.

Referring once again to FIG. 3, the exemplary information network 304 comprises a database 310 in communication with one or more sources 312 of information elements 303. The sources 312 may comprise virtually any type of information source that may give rise to information elements, regardless of their form. Preferably, the sources 312 are capable of providing the information elements in machine-readable format. For example, the sources 312 may comprise web sites on the World Wide Web, Internet chat rooms, etc. It is noted that the sources 312 are not necessarily limited to publicly available sources, and may include privately (even secretly) developed sources, such as government or industry reports. Alternatively, the sources 312 may comprise more traditional forms such as newspapers, television/radio broadcast stations, etc. where the content provided thereby may nevertheless be reduced to a form suitable for storage in the database 310. Thus, each information element comprises data or information that may be represented in any suitable form (possibly through conversion/translation operations known in the art but not shown) allowing it to be stored in the database 310. For example, an information element may comprise a computer text document or a hardcopy of a document in any language; a video or audio file in any format; or virtually any other form that may be persistently stored. Furthermore, the subject matter or topics embraced by the sources 312 may be as varying as the formats of the information elements they provide. As additional information elements are stored in the database 310, at least representative data 305 of the information elements 303 is provided to the routing controller 302 for eventual presentation to the work stations 306 in accordance with the analysis plan and attendant analysis goals. The representative data 305 may vary from simple address information where a given information element may be obtained, to textual/visual summaries and/or descriptions of information elements, to the actual information elements themselves or any other for suitable for eventual provision to the workstations 306. Techniques for obtaining or deriving such representative data 305 are well known in the art and need not be described in further detail herein.

In a presently preferred embodiment, the work stations 306 comprise processing devices such as desktop, laptop or handheld computers or other such processing devices well known to those having ordinary skill in the art. As described in further detail below, the routing controller 302 provides at least representative data 305 of the information elements to the work stations 306. Using display techniques described in greater detail below, each work station 306 allows a user thereof (i.e., an analyst) to access various information elements selected in accordance with the analysis plan for presentation to that particular user. As shown, the work stations 306 may be arranged according to topic groups. For example, a first plurality work stations 306a-b may be assigned to analysts covering a first topic designated T1, whereas a second plurality of work stations 306c-d may be assigned to analysts covering another topic designated Tn. Interposed between the routing controller 302 and work stations 306, the routing network 320 supports the delivery of the representative data (up to and including the actual information elements themselves) in accordance with known routing techniques. For example, the routing network may comprise virtually any type of communication network such as a private local area network or, at the other extreme, a publicly available network such as the Internet or World Wide Web, or combinations thereof using any suitable communication protocols. Security precautions (encryption, user authentication, etc.) may be utilized throughout the routing network 320 as necessary. As will be recognized by those having ordinary skill in the art, the present invention is not limited by the particular implementation of the routing network 320 employed. Furthermore, although a particular embodiment of the analyst network 300 is shown in FIG. 3, those having ordinary skill in the art will recognize that other implementations thereof are readily devisable. For example, although the routing controller 302 and database 310 are illustrated as centralized components, it is appreciated that these elements could be implemented in a decentralized fashion as desired. Further modifications to the analyst network 300 having no impact on the functionality taught herein may be apparent to those of skill in the art.

Figure 4:
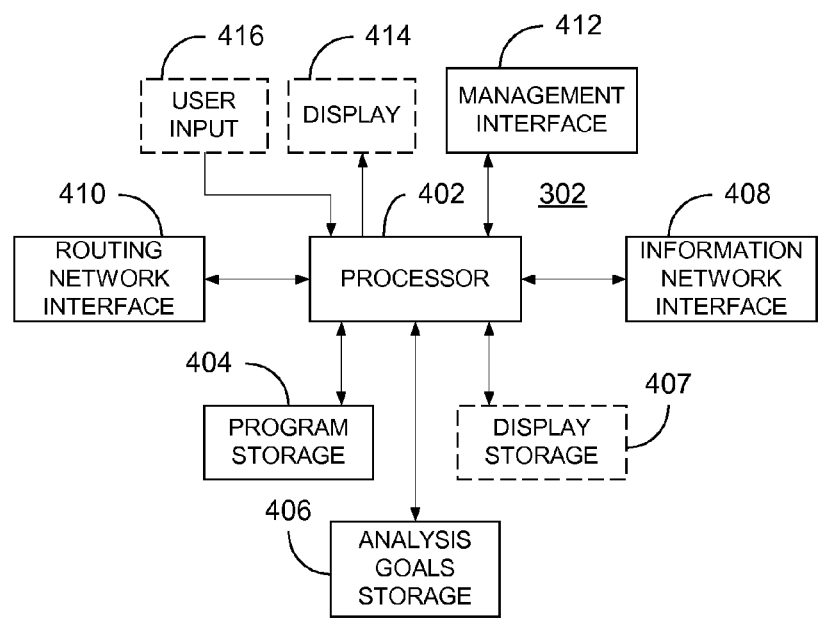
FIG. 4 is a schematic block diagram of a routing controller in accordance with an embodiment disclosed herein.

Referring now to FIG. 4, an exemplary implementation of a routing controller is further illustrated. As shown, the routing controller 302 comprises one or more processors 402 in communication with a program storage device 404 as well as an analysis goals storage device 406. As known to those of skill in the art, the processor 402 may comprise a microprocessor, microcontroller, digital signal processor, combination thereof or similar such devices. In a similar vein, the program storage device 404 and the analysis goals storage device 406 may be embodied by suitable volatile or non-volatile memory such as read only memory (ROM) and/or random access memory (RAM) or equivalents thereof. Additionally, although the program storage 404 and analysis goals storage 406 are illustrated as separate devices in FIG. 4, those having skill in the art will appreciate that they may in fact be embodied by the same physical device or devices. The program storage device 404 preferably stores executable instructions for execution by the one or more processors 402. The analysis goals storage device 406 preferably stores data that is representative of the desired analysis goals, such as mathematically expressed rules or conditional tests. Techniques for implementing goals in a form suitable for interpretation by the one or more processors 402 are known to those of skill in the art.

The processor(s) 402 is preferably in communication with an information network interface 408, a routing network interface 410 and a management interface 412. The information network interface 408 is provided to allow the routing controller 302 to communicate with the information network 304 using known communication protocols and techniques. For example, the information network interface 408 may comprise suitable hardware, firmware and/or software elements used to support, for example, an Ethernet or TCP/IP protocol. Other, higher-level protocols (e.g., HTTP, SSL, etc.) may likewise be supported in this manner. Similarly, the routing network interface 410 provides the routing controller 302 with ability to communicate with the routing network 320 using similar protocols that are, once again, preferably implemented using components know in the art. Finally, the management interface 412 allows the routing controller 302 to communicate with the management terminal 330 as described in further detail below. Any suitable protocol may be implemented by the management interface 412 thereby allowing the routing controller to communicate data and information back and forth with the management terminal 330.

Additional optional elements displayed in FIG. 4 include a displayed storage device 407 as well as user input devices 416 in a display 414. As known in the art, the display storage device 407 is used to support the presentation of display data via a suitable display device 414, and may comprise any suitable memory device such as those described above. Likewise, the display 414 may comprise any suitable device (e.g., a monitor, flat panel display, etc.) that allows a user interacting with the routing controller 302 to view suitable display data, such as that illustrated in FIGS. 9 and 10. The one or more user input devices 416 allow a user of the routing controller 302 (e.g., a system administrator) to interact therewith. For example, the user input devices 416 may comprise a mouse, keyboard, a stylus and touch screen display, microphone, etc.

Figure 5:
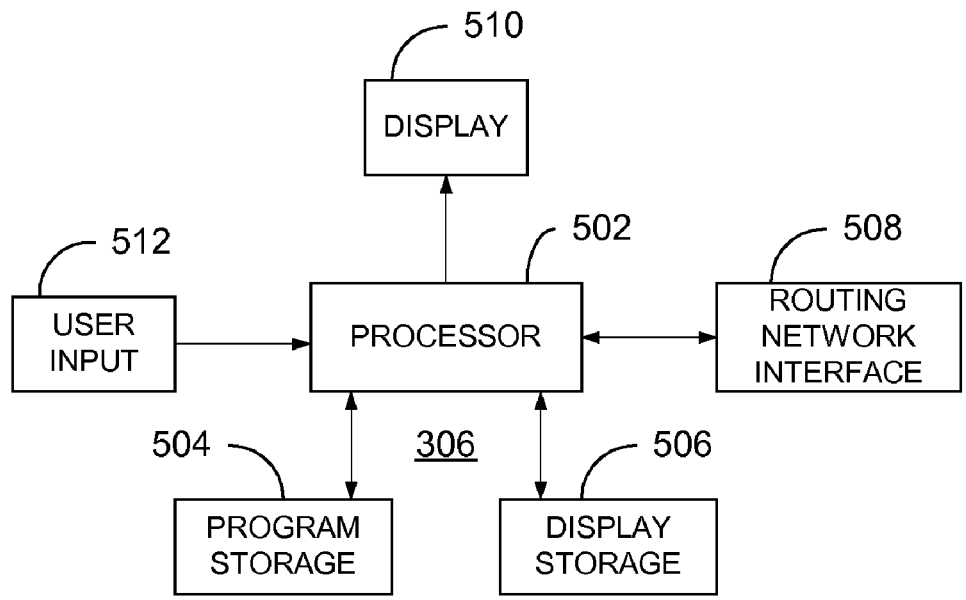
FIG. 5 is a schematic block diagram of a workstation in accordance with an embodiment disclosed herein.

Referring now in FIG. 5, an exemplary embodiment of a workstation 306 in accordance with the present invention is further illustrated. In particular, the workstation 306 comprises one or more processing devices 502 similar to those described above relative to FIG. 4. The one or more processing devices 502 are in turn coupled to a program storage device 504 as well as a display storage device 506. Serving essentially the same purposes as those described above relative to FIG. 4, both the program storage device 504 and the display storage 506 may be embodied by any suitable memory devices as known to those having skill in the art. Additionally, although the program storage device 504 and the display storage device 506 are illustrated as separate devices, they could in fact be embodied by one or more of the same physical devices.

A routing network interface 508 (substantially similar to the routing network interface 410) is provided to allow the workstation 306 to communicate with the routing network 320, as described above. Similarly, the workstation 306 preferably comprises a display device 510 as well as one or more user input devices 512, as described above relative to FIG. 4. For example, in accordance with a preferred embodiment, the workstation 306 may be embodied in a commonly used desktop, laptop or handheld computer. Alternatively, the workstation 306 may be embodied as a mobile telephone, personal digital assistant or other such devices.

Figure 6:
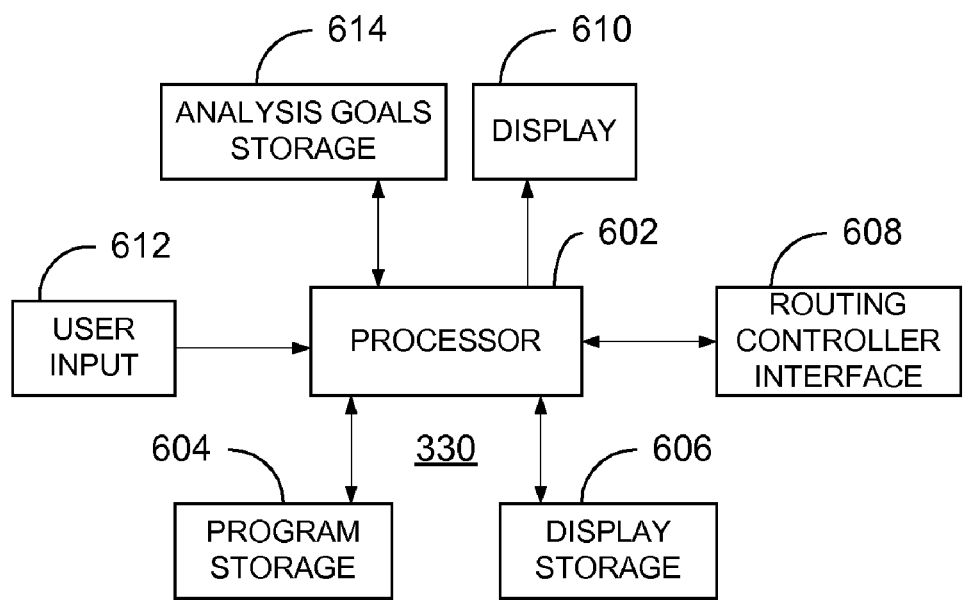
FIG. 6 is a schematic block diagram of a management terminal in accordance with an embodiment disclosed herein.

Referring now to FIG. 6, an exemplary management terminal is further illustrated. Once again, the management terminal 330 may comprise one or more processing devices 602 as described above relative to FIGS. 4 and 5. In a similar vein, the processing devices 602 communicate with a program storage device 604 as well a display storage device 606 as described above relative to FIG. 5. Further still, an analysis goals storage device 614 is provided similar in structure to the analysis goals storage device 406 illustrated in FIG. 4. A routing controller interface 608 is provided in communication with a processor 602, thereby allowing the management terminal 330 to communicate with the routing controller 302 as noted previously. Additionally, the management terminal 330 is preferably equipped with a display device 610 as well as one or more user input devices 612 as described above. Although FIGS. 4, 5 and 6 illustrate respective embodiments of routing controllers, workstation and management terminals in accordance with embodiments of the present invention, those having ordinary skill in the art will appreciate that those other implementations may be equally employed without loss of generality.

Figure 7:
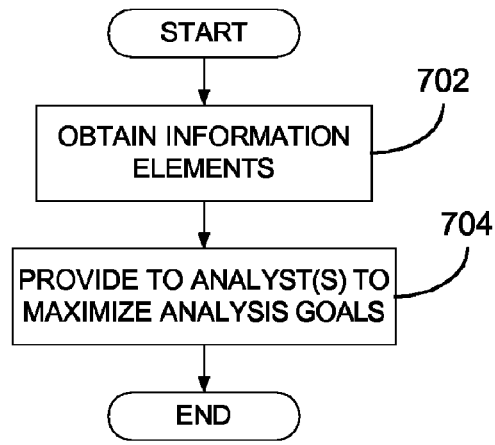
FIG. 7 is a flow chart illustrating processing for optimizing analytical effectiveness in accordance with an embodiment.
Figure 8:
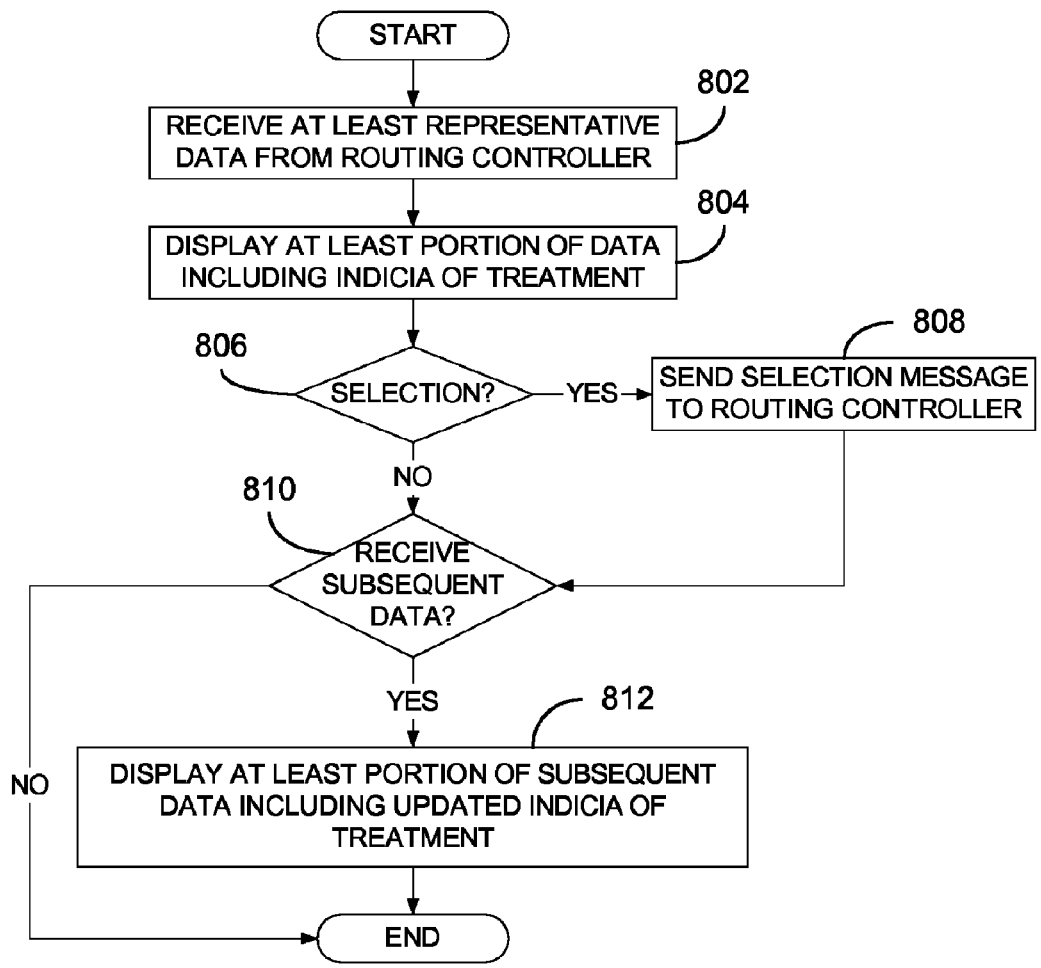
FIG. 8 is a flow chart illustrating processing for presenting acquired information elements so as to enable prioritization by individual analyst in accordance with an embodiment disclosed herein.
Figure 11:
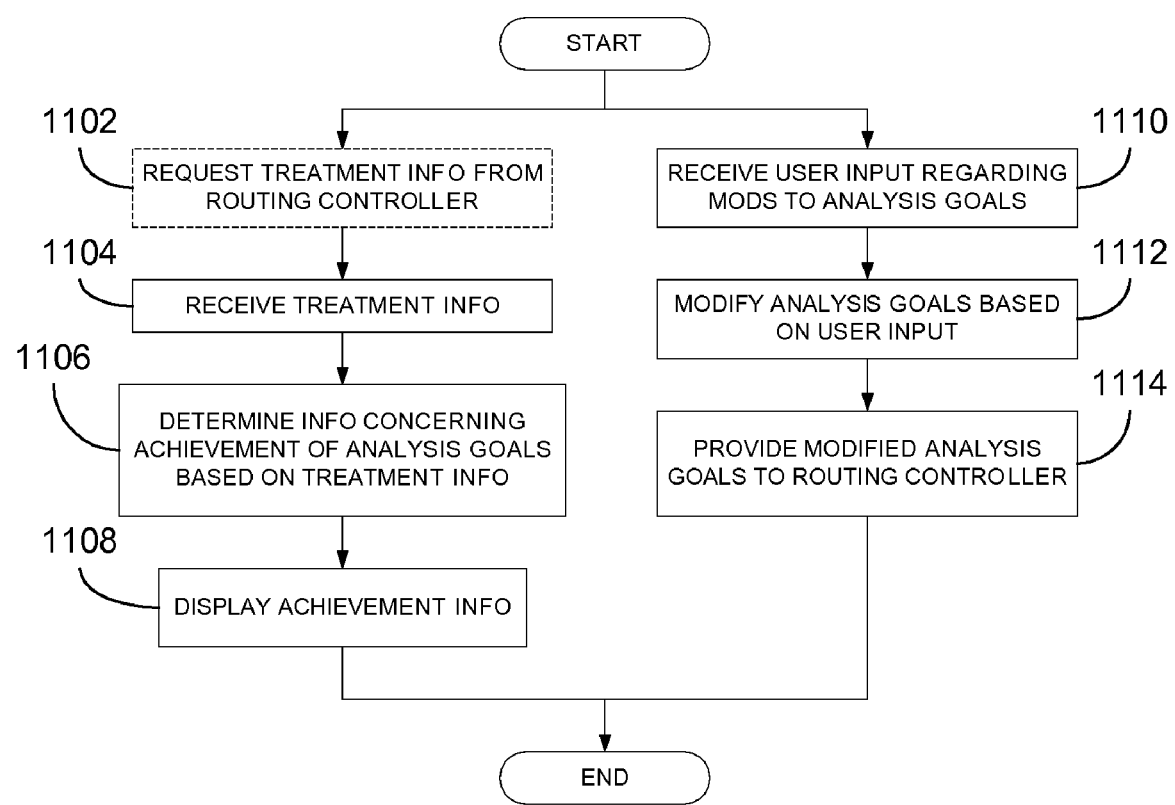
FIG. 11 is a flow chart illustrating processing for monitoring and/or controlling analytical performance in accordance with an embodiment disclosed herein.

Referring now to FIG. 7, processing in accordance with an embodiment of the present invention for optimizing analytical effectiveness is further described. Processing described herein, including that shown in FIGS. 7, 8 and 11, is preferably implemented using executable instructions stored in processor-readable devices and executed by suitable processing devices. However, those having ordinary skill in the art will appreciate that other implementation techniques, such as programmable logic arrays, application specific integrated circuits (ASICs), state machines, etc. may be equally employed.

Regardless of the particular implementation technique used, the processing illustrated in FIG. 7 begins at block 702 where, in accordance with the exemplary embodiments described above, a routing controller obtains or acquires information elements via an information network. In this regard, it is possible that the information elements are acquired by the routing controller either by virtue of such information elements being provided directly to the routing controller without prior request or intervention (i.e., they are "pushed" to the routing controller), or in response to specific requests (e.g., search queries provided by the routing controller). As described above, information elements may comprise individual documents or the like. Alternatively, an information element may comprise a cluster of information elements based on the similarity of the information contained therein. That is, each cluster may comprise a plurality of information elements pertaining to a single topic. This may be useful in those instances in which, for example, a single source 312 includes multiple information elements concerning a single topic and that may be best analyzed as a unitary whole. In these instances, each cluster may have its own treatment status (described in further detail below) as in the case of a single information element.

Regardless of the manner in which information elements are acquired and their particular format, processing continues at block 704 where various ones of the information elements (or clusters) are provided to one or more analysts in such a manner as to maximize achievement of analysis goals defined as part of the analysis plan. As noted previously, exemplary analysis goals may include one or more of: breadth of topic coverage, depth of topic coverage, degree of analyst group cross-fertilization and degree of analyst utilization. These goals may be expressed in a variety of ways. For example, with regard to breadth of coverage, these goals may be expressed as rules to ensure: that repeated considerations of a given information element by multiple analysts are minimized; that the number of information elements routed to analysts for each topic is proportional to the relative priority of each topic, the number of information elements per topic to be covered and the uniqueness of information elements within each topic; that the number of times an analyst reads the same information-whether in a single information element or redundant data presented in unique information elements—is minimized; or that information elements within a topic are clustered where possible and that representation of such clusters is enforced with any presented results.

One of the differences between depth and breadth of coverage is that the heuristics for depth result in de-emphasizing redundant information elements that achieve breadth of coverage so that additional information elements within a topic can be presented more frequently to an analyst. This can be achieved by eliminating redundancy across analysts. That is, the number of times an individual information element is presented to an analyst is minimized. This results in a greater number of unique information elements being presented towards the top of a queue of information elements available for review by a given information analyst. Combined with the restriction of presenting an analyst with information elements from a single topic area, this results in depth of coverage. A similar approach may be used for groups of analysts (i.e. minimize the number of times items are presented to members of a group). Alternatively, depth can be achieved by maximizing the number of sources/source types presented for a given topic. To this end, rather than consistently presenting the same information elements from the same sources and source types repeatedly, preference can be given to sources and source types that have not been previously analyzed (e.g. has an analyst considered satellite pictures or listened to relevant audio, etc.).

Often, an important aspect of achieving institutional awareness and avoiding unconsidered information elements is ensuring that messages are read across analyst groups. It is noted that, as used herein, an analyst group may reflect a formal or informal definition. That is, formal analyst groups are defined in accordance with an organizational imperative, e.g., according to an employer or other managing entity. Alternatively, informal analyst groups reflect the social interactions of individual analysts with each other, regardless of any formal group boundaries. Thus, in essence, if an information element is going to be read twice, it is preferable for the two analysts who read it to be distant from each other with regard to their respective (formal or informal) group affiliations. This is because close colleagues are likely to communicate with each other, and sending both colleagues the same information element is wasteful because they are likely to talk to each other about it anyway if the information element is of interest. By having the information element go to analysts across groups, each of the two analysts are more likely to discuss it with different colleagues if it is of particular interest, thereby promoting a greater level of awareness. Stated more concretely, this can be achieved by maximizing the number of unique groups (both formal and informal) exposed to an information element or, from a different perspective, raise the priority of a given information element if no one in a particular group has considered the information element.

Finally, with regard to analyst utilization, a variety of relatively straightforward principles may be enforced. For example, it is desirable to minimize disparity in the number of information elements assigned to individual analysts, although the number of information elements assigned to a given analyst should reflect the number of items that he/she has historically able to effectively examine. Additionally, it is desirable to assign high-priority or "stranded" information elements (i.e., not previously considered by anyone) to the most available "matching" analyst.

In addition to the rules described above for maximizing analysis goals, provision of the information elements to selected analysts (and, thereby, maximization of analysis goals) may be further based upon either/both of the characteristics of individual analysts as wells as the characteristics of groups of analysts. With regard to the former, selection of specific analysts may be based upon access rights of an individual analyst, characteristics of information processing by the individual analyst, characteristics of information handling by individual analysts as well as any group affiliations of an individual analyst. As used herein, access rights denote the ability of an individual analyst to gain access to specific items of information elements that may be protected by suitable security mechanisms, e.g., "confidential", "secret" or "top secret" classifications. Information processing characteristics of an individual analyst describes the particular type of information elements that an analyst has processed in the past, i.e., history of past requests, history of past filters/queries/search terms, etc. In a similar vein, information handling characteristics describe how an analyst has previously used information elements, e.g., what information elements have been deleted, what information elements have been saved, what information elements have been forwarded to other users, etc. Finally, group affiliations of an individual analysts may reflect both formal and informal group associations as described above.

Alternatively, the identification of selected analysts may be based upon characteristics of analyst groups that exist within the plurality of available of analysts. For example, such characteristics of analyst groups may include the assignments of a particular analyst group, the access rights of a particular analyst group, the information processing characteristics of an analyst group as well as information handling characteristics of that analyst group, as well as inter-group communication characteristics of a given group. The access rights, information processing characteristics, and information handling characteristics of an analyst group are similar in definition to the characteristics described above relative to individual analysts. The assignments of an analyst group refers to the particular topics assigned to that analyst group, and/or types of information elements that may be provided to that analyst group. The inter-group communication characteristics of an analyst group refers to the degree to which an individual analyst group cooperates with or shares information with other analyst groups. For example, if the topic is the educational system in Iraq, reports of reduced attendance may be received. In accordance with the characteristics described above, it is possible to prevent only narrow education specialists or groups of such specialists from reviewing particular information since these colleagues are already likely to share relevant information. Instead of presenting the same information to two such analysts, it may be beneficial to seed the information in a different analyst community—say a transportation group—thereby potentially allowing one or more analysts in this alternative community to draw the connection that a disruption to the bus system may explain the reduced attendance of teachers or students resulting in more children roaming the streets.

Referring now to FIG. 8, processing for the presentation of acquired information elements that allows the prioritization of processing of information elements by individual analysts is further illustrated. Once again, the processing illustrated in FIG. 8 is preferably implemented using stored, executable instructions carried out by one or more processing devices as described above. In particular, the processing illustrated in FIG. 8 is preferably implemented via a work station of the type described above. Regardless, beginning at block 802, data that is at least representative of acquired information elements is received by a work station. The data received at block 802 is based on the analysis described above in which particular information elements are routed to analysts that have been selected to receive them so as to maximize analysis goals. Data that is representative of an information element refers to the fact that, rather than providing the actual information elements, it may be desirable to provide only data or information that is descriptive of an individual information element or that enables the individual information element to be accessed in its entirety, e.g., a hyperlink.

Regardless of the nature of the representative data acquired at block 802, processing continues at block 804 where at least a portion of the received data representative of the acquired information elements is displayed in accordance with known techniques. Exemplary embodiments of such displays are further illustrated in FIGS. 9 and 10, described in greater detail below. In accordance with an embodiment of the present invention, the displayed results preferably comprise information that enables individual analysts to prioritize processing of the acquired information elements. The information enabling such prioritization is preferably indicative of processing performed by a portion of the plurality of analysts within the analyst network. In particular, it is preferred that the prioritization-enabling information comprise various indicia of treatment indicative of treatment statuses for at least a portion of the acquired information elements. As used herein, a treatment status refers to the degree and/or nature of previous analysis applied to a given information element throughout the entirety of, or at least a portion of, the plurality of analysts available in the analyst network. Examples of this are further illustrated with reference to FIGS. 9 and 10.

Figure 9:
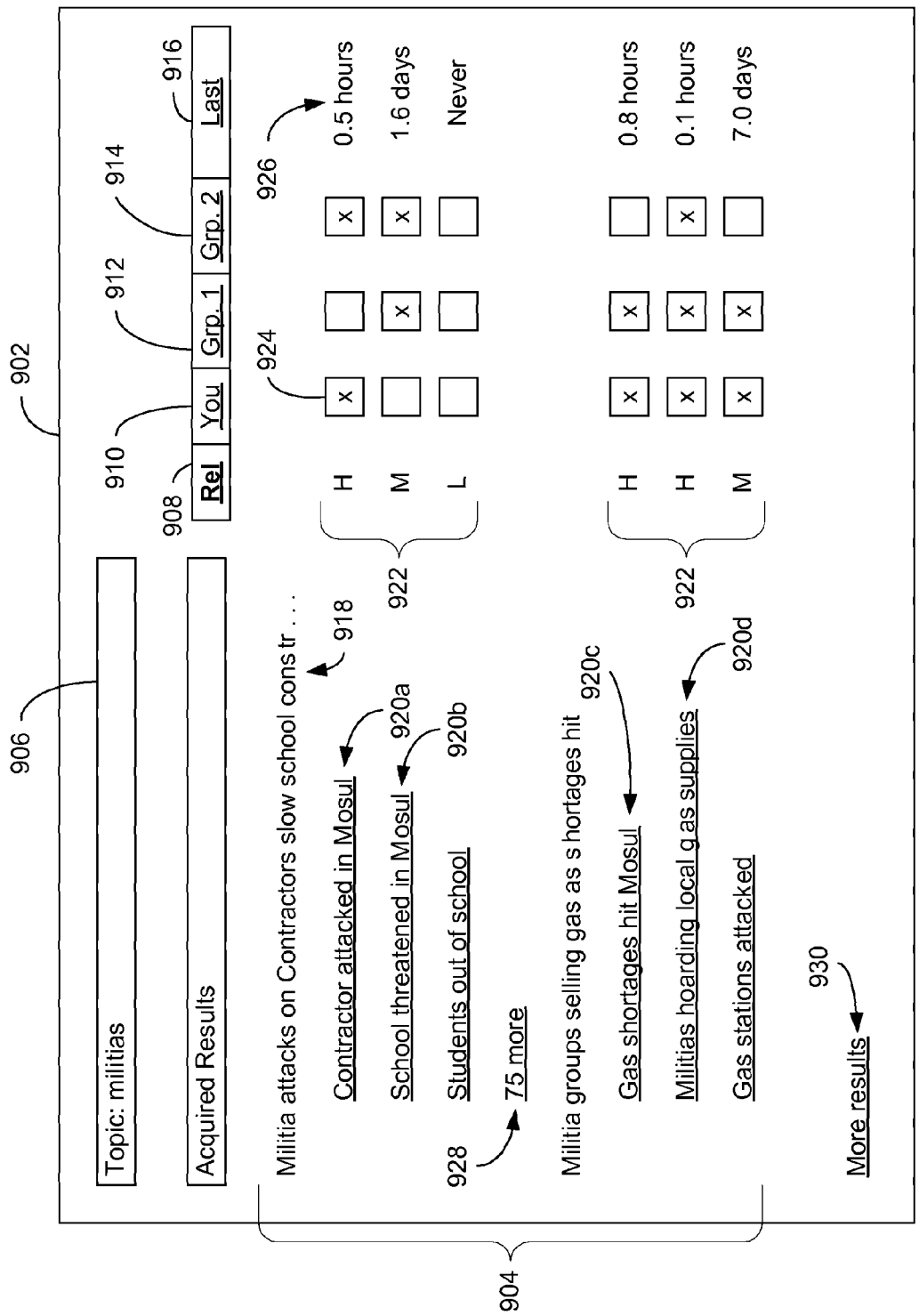
FIGS. 9 and 10 illustrate exemplary embodiments of a user interface in accordance with embodiments disclosed herein.

Referring now to FIG. 9, an exemplary user interface 902, such as may be presented on a suitable display device, is illustrated. Within the user interface 902, displayed results 904 concerning a given topic 906 include various examples of the data representative of acquired information elements 920 and, optionally, one or more cluster headings 918. For example, under the cluster heading "Militia attacks on contractors slows school construction", a plurality of information elements (as illustrated by the representative data) 920a-b are show. Note that each of the plurality of information elements 920a-b are, in this example, embodied as hyperlinks, the selection of which allows a user to access the actual, underlying information element using known techniques. Similarly, a link 928 to additional information elements within that cluster heading 918 may be provided. More generally, a link 930 to further information elements (possibly relating to other clusters) may also be provided.

To further assist an analyst in prioritizing individual information elements to analyze, various sorting options 908-916 and indicia of treatment 922-926 are also provided. For example, the various information elements 920 may be sorted according to their relevance 908 to the particular topic 906 being considered, by an indication whether the various elements have previously been analyzed by the analyst 910, by any analyst within one or more groups 912, 914, or by the last time each of the various information elements was last considered 916. Techniques for sorting results (i.e., the acquired information elements) are well known to those having skill in the art. In the example shown, the information elements 920 are sorted by their relevance from highest to lowest, although the inverse (lowest to highest) may be equally employed.

Various examples of indicia of treatment are illustrated in FIG. 9. As used herein, such indicia may be provided using separately identifiable, visual indicators (e.g., flags, color codes, ranking values or descriptions, etc.), positional information within the displayed results (e.g., higher position within a list indicative of less thorough treatment, lower position within a list indicative of more thorough treatment), groupings, etc. Additionally, such indicia could also include multiple levels or categories, e.g., one indicator for an individual analyst, another for his analyst group, another for the analyst network, etc. For example, as shown in FIG. 9, the indicia 922 associated with the relevance rankings are represented by symbols (H, M, L) uniquely corresponding to "high", "medium" and "low" relevancy rankings. Alternatively, flags 924 may be used to indicate, for example, the status of a binary value, i.e., "considered" or "not considered". Thus, in FIG. 9, the flags 924 represent whether a given information element has been considered by the individual analyst or either of two respective analyst groups. In yet another embodiment, alphanumeric text may be used to convey very specific status information. For example, the indicia 926 concerning the time interval since an information element was last considered may specifically state the time period in terms of hours, days, weeks, etc. as shown.

Figure 10:
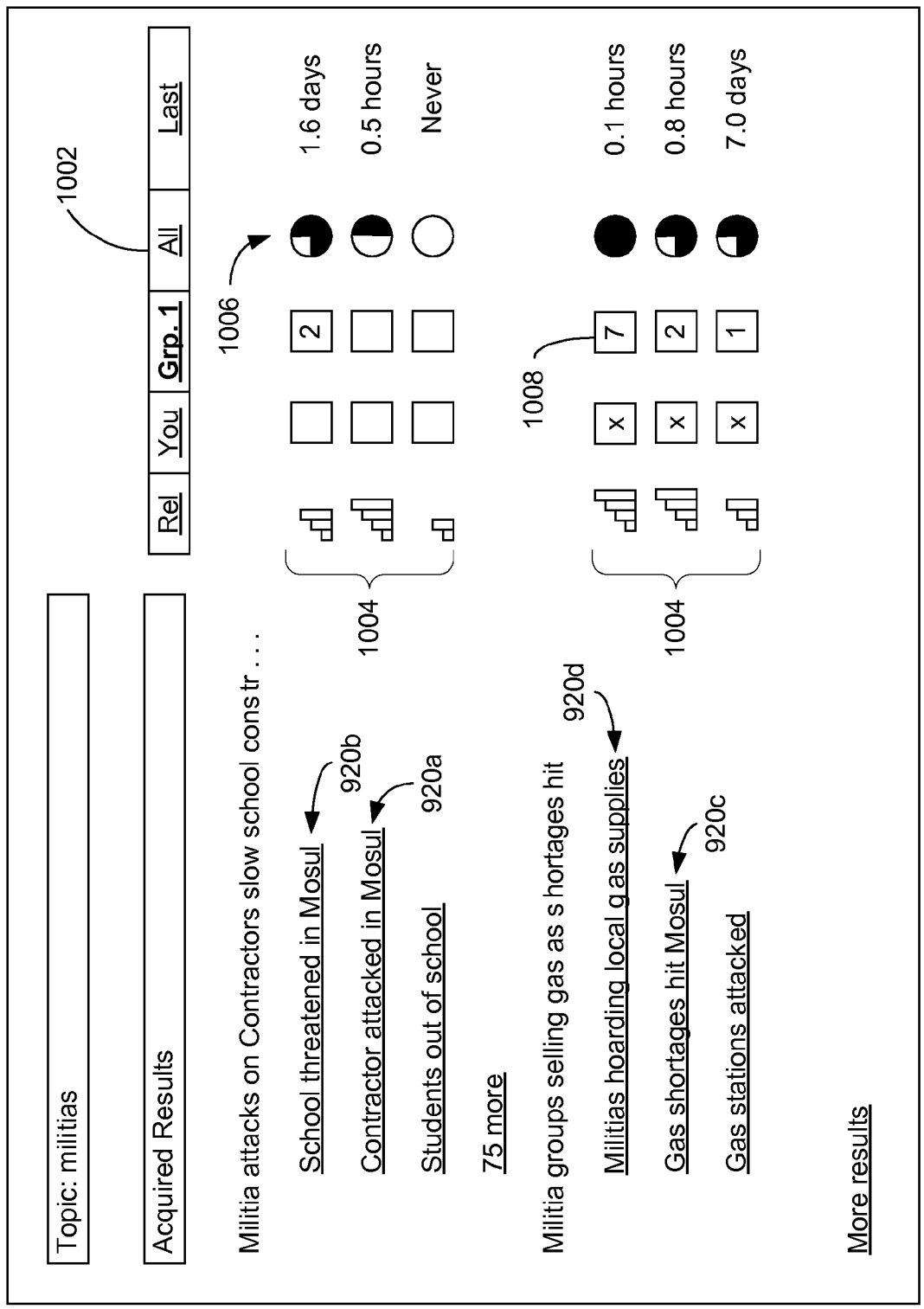

Further examples of suitable indicia are illustrated in FIG. 10. Here, graphical indicia 1004, 1006 may be employed to convey the degree of an underlying treatment status. For example, escalating bars 1004 may be used to indicate increasing relevance, or filled in circles 1006 may be used to express the degree to which a given information element has been considered, in the example shown, by all of the available analysts 1002. Further still, specific values 1008 may be used in place of binary flags to more precisely indicate the degree of penetration of a given information element into an analyst group. Those having ordinary skill in the art will appreciate that the examples illustrated in FIGS. 9 and 10 are representative of a variety of such indicia that may be employed in conjunction with the various embodiments of the present invention.

Once the displayed results have been provided to a user (analyst), it may become necessary to update the indicia of treatment from time to time as the underlying treatment statuses change. For example, when an analyst reviews an information element, that information element's treatment status should be updated to reflect this fact. Similarly, the review of a displayed information element by other analysts should be reflected in the displayed results, thereby allowing the analyst to continuously assess his/her prioritization of a given information element. Referring once again to FIG. 8, this processing is illustrated at block 806 where it is determined whether the work station has received selection information corresponding to a selected information element. For example, with reference to FIG. 9, an analyst may "click" on the hyperlink corresponding to a first information element 920a. Using known techniques, this action of selecting the hyperlink is recognized by the workstation.

If selection information is received by the work station, processing continues at block 808 where the work station sends a selection message identifying the selected information element to the routing controller. Techniques for sending and receiving such messages are well known in the art. In this manner, the routing controller is able to update the treatment status for the selected information element. For example, not only is the treatment status updated to reflect the selection by the particular analyst, but also to reflect such selection upon any analyst groups (both formal and informal) to which the analyst belongs. Thereafter, the routing controller provides the updated treatment status for the selected data element to the analyst's work station, which updated treatment status is detected at block 810. Once the updated treatment status has been received by the work station, processing continues at block 812 where at least that portion of the displayed results corresponding to the updated treatment status is displayed to reflect the updated treatment status, e.g., an updated treatment indicator is provided.

Alternatively, if no selection is made at block 810, data may nevertheless be received at block 810 due to, on the one hand, subsequent acquired information elements (e.g., as a result of an ongoing search query or pushed information elements) being provided by the remote controller to the workstation or, on the other hand, due to updates to various relevant treatment statuses (i.e., corresponding to currently displayed information elements) due to consideration of information elements by other analysts within the analyst network. In the former case, processing continues at block 810 where the processing of block 804 is essentially repeated for the representative data corresponding to the subsequently acquired information elements. In the latter case, processing continues at block 810 where at least that portion of the displayed results corresponding to the updated treatment status is displayed to reflect the updated treatment status. Note that, in the latter scenario, the remote controller has knowledge of which data elements have been assigned/provided to the analyst and is therefore able to push updated treatment statuses as they arise.

Referring now to FIG. 11, processing for monitoring and/or controlling analytical performance is further illustrated. Once again, the processing illustrated in FIG. 11 is preferably implemented using stored, executable instructions carried out by one or more processing devices as described above. In particular, the processing illustrated in FIG. 11 is preferably implemented via a management terminal as described above. FIG. 11 illustrates two parallel processing paths: on the left, processing for monitoring achievement of analysis goals is described whereas, on the right, processing for controlling analytical effectiveness through the modification of analysis goals is described.

Beginning at block 1102, the management terminal may optionally send a request to the routing controller for information concerning treatment of information element. Once again, techniques for the transmission and reception of such requests are well known in the art. In an alternative embodiment, it is not necessary to request the treatment information and, instead, the routing controller may, from time to time, automatically provide the treatment information to the management terminal. Regardless of the cause, the treatment information is received by the management terminal at block 1104.

Treatment information is data illustrating how information elements are being processed (i.e., selected for consideration/review) by the analyst network generally, and by specific individual analysts or analyst groups. Such treatment information may reflect any suitable metric for providing the desired understanding of the achievement of analysis goals. For example, in a presently preferred embodiment, such treatment information includes, on a per topic basis, the number of information elements processed by each of the entities (individual analysts and analyst groups), processing rates of information elements by each of the entities, identifications of specific entities that have processed information elements and/or degrees of interaction between entities (as measured, for example, by communications traffic such as email/instant messaging/etc. between entities, previous mutual assignments, etc.). For instance, on the topic of "foreign military spending", the treatment information may include metric data concerning the number of information elements on this topic processed throughout the entire analyst network, by each group of analyst and by each individual analysts, or the rate at which such information elements are processed by these entities. Those having skill in the art will appreciate that other information concerning the treatment of information elements may be equally employed as a matter of design choice.

Having received the treatment information, processing continues at block 1106 where the management terminal determines information regarding the achievement of the analysis goals based on the treatment information. As noted above, the analysis goals may include, for example, desired targets for breadth of coverage, depth of coverage, cross-fertilization and analyst utilization. To this end, the treatment information may be manipulated/combined/etc. to provide the desired analysis goals achievement information. For example, when assessing whether the desired breadth of coverage has been achieved, the identifications of the various analysts and/or analyst groups may be compared across specific topics. Alternatively, when assessing analyst utilization, the numbers of processed information elements/rates of information element processing may be combined and/or compared to determine how well individual analysts and/or analyst groups are performing. More direct assessments such as the percentage of available information elements that have been processed within a given time period, the degree of coverage of distinct subtopics or document clusters, the percentage of documents covered with a relevance ranking above a certain threshold, the number of documents about a topic sampled over some period of time (ensuring that changes over that time are covered), etc., may also be employed. Regardless of the manner in which it is derived, the information regarding the achievement of analysis goals is thereafter displayed on a suitable display device at block 1108. Of course, the information regarding the achievement of analysis goals could also be published in other manners, such as being sent electronically to various management personnel (e.g., via email as an enclosed report), etc.

Substantially in parallel to, or in addition to the processing described above, processing may also be performed beginning at block 1110 where the management terminal receives user input concerning modifications to the analysis goals. Techniques for receiving such input using, for example, user input devices 612, are known in the art. As further shown in FIGS. 4 and 6, both the remote controller and the management terminal may include storage for the analysis goals. Generally, both analysis goals storage components will comprise the same data representative of the analysis goals. However, when the modifications to the analysis goals are received at block 1110, processing continues at block 1112 where the analysis goals stored in the management terminal are modified according to the received modifications. The manner in which such modifications are represented and made to the analysis goals necessarily depends on the particular representation of the analysis goals. For example, where the analysis goals include a list of desired topics to be considered within the analyst network as well as their respective priorities, the modifications may include the addition of new topics or indications of topics to be removed. Alternatively, the modifications may include changes to the relative priorities of existing topics. In another example, the modifications may include changes to the specific assignments of individual analysts or groups of analysts. Further still, the modifications may include rule changes concerning the various parameters described above effecting the breadth and/or depth of coverage of particular topics.

Once the modifications to the analysis goals have been made, the updated analysis goals residing in the management terminal's storage are provided to the routing controller at block 1114 using, for example, know database replication techniques. In this manner, the routing controller can continue subsequent operations using the updated analysis goals.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

What is claimed is:

1. In a management terminal in communication with, via a routing controller, a computer-implemented analyst network used by a plurality of analysts receiving information elements from an information network via the routing controller, a method for monitoring analytical effectiveness of the processing of the information elements by the plurality of analysts, comprising:
   receiving, from the routing controller, information concerning treatment of the information elements by the plurality of analysts;
   determining information concerning achievement of analysis goals, wherein the analysis goals are applied to the plurality of analysts using the computer-implemented analyst network, defined as part of an analysis plan, by the plurality of analysts based on the information concerning the treatment of the information elements,
   wherein the information concerning the treatment of the information elements further comprises, for each topic of the plurality of topics, a degree of interaction between groups of analysts of the plurality of analysts that have processed information elements concerning the topic, wherein the degree of interaction is measured by communication traffic or previous mutual assignments between the groups of analysts of the plurality of analysts;
   displaying the information concerning the achievement of the analysis goals to provide displayed results.

2. The method of claim 1, further comprising:
   sending a request to the routing controller for the information concerning the treatment of the information elements.

3. The method of claim 1, wherein the information concerning the treatment of the information elements further comprises, for each topic of a plurality of topics, at least one of: a number of information elements concerning the topic processed by the plurality of analysts or a processing rate of information elements concerning the topic processed by the plurality of analysts.

4. The method of claim 3, wherein determining the information concerning the achievement of analysis goals further comprises, for at least two topics of the plurality of topics, comparing either the number of information elements concerning each topic of the at least two topics processed by the plurality of analysts or the processing rate of information elements concerning each topic of the at least two topics processed by the plurality of analysts.

5. The method of claim 3, wherein the information concerning the treatment of the information elements further comprises, for each topic of a plurality of topics, identification of at least one of: at least one individual analyst of the plurality of analysts or at least one group of analysts of the plurality of analysts that have processed information elements concerning the topic.

6. The method of claim 5, wherein determining the information concerning the achievement of analysis goals further comprises, for at least one topic of the plurality of topics, categorizing either the number of information elements concerning each of the at least one topic processed by the plurality of analysts or the processing rate of information elements concerning each of the at least one topic processed by the plurality of analysts according to either the identification of the at least one individual analyst or the identification of the at least one group.

7. The method of claim 1, wherein the information concerning the treatment of the information elements further comprises, for each topic of a plurality of topics, identification of at least one of: at least one individual analyst of the plurality of analysts or at least one group of analysts of the plurality of analysts that have processed information elements concerning the topic.

8. The method of claim 1, further comprising:
modifying, in response to user input, the analysis goals used by the routing controller to route information elements to the plurality of analysts to provided modified analysis goals; and
providing the modified analysis goals to the routing controller.

9. In a management terminal in communication with, via a routing controller, a computer-implemented analyst network used by a plurality of analysts receiving information from an information network via the routing controller, a method for controlling processing of information elements acquired via the information network based on analytical effectiveness of the processing of the information elements by the plurality of analysts, comprising:
receiving user input concerning modifications to analysis goals, defined as part of an analysis plan, used by the routing controller to route information elements to the plurality of analysts, wherein the analysis goals are applied to the plurality of analysts using the computer-implemented analyst network;
wherein the information concerning the treatment of the information elements further comprises, for each topic of the plurality of topics, a degree of interaction between groups of analysts of the plurality of analysts that have processed information elements concerning the topic, wherein the degree of interaction is measured by communication traffic or previous mutual assignments between the groups of analysts of the plurality of analysts;
modifying the analysis goals based on the user input to provide modified analysis goals; and
providing the modified analysis goals to the routing controller.

10. The method of claim 9, wherein the analysis goals comprise rules governing coverage by the plurality of analysts of a plurality of topics, and wherein modifying the analysis goals further comprises modifying the rules to adjust breadth or depth of coverage of a topic of the plurality of topics.

11. The method of claim 9, wherein the analysis goals comprise rules governing coverage by the plurality of analysts of a plurality of topics, and wherein modifying the analysis goals further comprises modifying the rules to adjust a priority of a topic of the plurality of topics.

12. The method of claim 9, wherein the analysis goals comprise rules governing coverage by the plurality of analysts of a plurality of topics, and wherein modifying the analysis goals further comprises modifying the rules to adjust which groups of analysts of the plurality of analysts should provide coverage to a topic of the plurality of topics.

13. A management terminal for use with an analyst network used by a plurality of analysts receiving information elements from an information network via a routing controller, comprising:
a processor;
a display, coupled to the processor;
a first storage device, coupled to the processor, having stored therein display data corresponding to information concerning achievement of analysis goals, defined as part of an analysis plan, by the plurality of analysts, wherein the information concerning the achievement of the analysis goals is based on information, received from the routing controller, concerning the treatment of information elements by the plurality of analysts: and
a second storage device, coupled to the processor, having stored therein executable instructions that, when executed, cause the processor to:
receive, from the routing controller, the information concerning treatment of the information elements by the plurality of analysts;
determine the information concerning the achievement of the analysis goals by the plurality of analysts based on the information concerning the treatment of the information elements, wherein the analysis goals are applied to the plurality of analysts using the analyst network;
determine the display data based on the information concerning the achievement of the analysis goals; and
wherein the information concerning the treatment of the information elements further comprises, for each topic of the plurality of topics, a degree of interaction between groups of analysts of the plurality of analysts that have processed information elements concerning the topic, wherein the degree of interaction is measured by communication traffic or previous mutual assignments between the groups of analysts of the plurality of analysts; and
display the display data.

14. The management terminal of claim 13, further comprising: means, coupled to the processor, for receiving user input concerning modifications to the analysis goals used by the routing controller to route information elements to the plurality of analysts;
means, implemented by the processor, for modifying the analysis goals based on the user input to provide modified analysis goals; and
means, coupled to the processor, for providing the modified analysis goals to the routing controller.

15. The management terminal of claim 14, further comprising: a third storage device, coupled to the processor, having stored therein information concerning characteristics of each analyst of the plurality of analysts, characteristics of analyst groups within the plurality of analysts and the desired routing objectives.

16. The management terminal of claim 13, further comprising:
a routing controller interface, coupled to the at least one processor, for communicating with the routing controller.

17. A management terminal for use with an analyst network used by a plurality of analysts requesting information elements from an information network via a routing controller, comprising:
a processor;
a display, coupled to the processor;
a first storage device, coupled to the processor, having stored therein analysis goals, defined as part of an analysis plan, used by the routing controller to route information elements to the plurality of analysts;
wherein the information concerning the treatment of the information elements further comprises, for each topic of the plurality of topics, a degree of interaction between groups of analysts of the plurality of analysts that have processed information elements concerning the topic, wherein the degree of interaction is measured by communication traffic or previous mutual assignments between the groups of analysts of the plurality of analysts;

a second storage device, coupled to the processor, having stored therein executable instructions that, when executed, cause the processor to:
receive user input concerning modifications to the analysis goals, wherein the analysis goals are applied to the plurality of analysts using the analyst network;
modify the analysis goals based on the user input to provide modified analysis goals;
and provide the modified analysis goals to the routing controller.

18. The management terminal of claim 17, wherein the second storage device further comprises executable instructions that, when executed, cause the processor to: store the modified analysis goals in the first storage device.

* * * * *